(12) United States Patent
Baker

(10) Patent No.: US 11,377,131 B2
(45) Date of Patent: Jul. 5, 2022

(54) DOLLY AND DOLLY ARRANGEMENT

(71) Applicant: LOADHOG LIMITED, Sheffield (GB)

(72) Inventor: Martin Baker, Rotherham (GB)

(73) Assignee: LOADHOG LIMITED

( * ) Notice: Subject to any disclaimer, the term of this patent is extended or adjusted under 35 U.S.C. 154(b) by 0 days.

(21) Appl. No.: 17/279,199

(22) PCT Filed: Sep. 24, 2019

(86) PCT No.: PCT/GB2019/000140
§ 371 (c)(1),
(2) Date: Mar. 24, 2021

(87) PCT Pub. No.: WO2020/065244
PCT Pub. Date: Apr. 2, 2020

(65) Prior Publication Data
US 2022/0032985 A1     Feb. 3, 2022

(30) Foreign Application Priority Data

Sep. 27, 2018 (GB) .................................... 1815778
Jul. 8, 2019 (GB) .................................... 1909758
Sep. 20, 2019 (GB) .................................... 1913560

(51) Int. Cl.
*B62B 3/16* (2006.01)
*B62B 5/00* (2006.01)

(52) U.S. Cl.
CPC .............. *B62B 5/0093* (2013.01); *B62B 3/16* (2013.01)

(58) Field of Classification Search
CPC ........ B62B 5/0093; B62B 5/0083; B62B 3/16
See application file for complete search history.

(56) References Cited

U.S. PATENT DOCUMENTS

| | | | | |
|---|---|---|---|---|
| 5,823,549 A | * | 10/1998 | Morgan, Jr. .......... | B62B 5/0083 280/33.998 |
| 6,257,152 B1 | * | 7/2001 | Liu ......................... | B62B 3/16 280/33.998 |
| 7,293,785 B2 | * | 11/2007 | Bush ....................... | B62B 3/004 280/47.35 |
| 2006/0087092 A1 | | 4/2006 | Chubb | |
| 2012/0043732 A1 | | 2/2012 | Itmec | |

FOREIGN PATENT DOCUMENTS

| | | |
|---|---|---|
| DE | 202005005087 U | 6/2005 |
| EP | 1 820 714 A2 | 8/2007 |
| EP | 3275765 A1 | 1/2018 |
| GB | 2 207 894 A | 2/1989 |
| JP | 2002-293243 A | 10/2002 |
| JP | 2016168868 A | 9/2016 |

* cited by examiner

*Primary Examiner* — John D Walters
(74) *Attorney, Agent, or Firm* — Clark Hill PLC; James R. Foley

(57) ABSTRACT

A dolly (10) comprises a body (12) having an upwardly projecting first locating formation (20) for locating a further dolly thereon in a stacked condition of said dollies. The body (12) has a second locating formation (21) for stacking the dolly (10) on a further dolly in a stacked condition of said dollies. The first locating formation (20) is engageable with a second locating formation on the further dolly stacked on the first mentioned dolly, and the second locating formation (21) is engageable with a first locating formation of the further dolly on which the first mentioned dolly (10) is stacked.

19 Claims, 11 Drawing Sheets

DOLLY AND DOLLY ARRANGEMENT

This invention relates to dollies. This invention relates to dolly arrangements which comprise a plurality of dollies stacked upon one another. This invention also relates to methods of stacking dollies to form dolly arrangements. Embodiments of this invention also relates to dollies for use in forming dolly arrangements.

Dollies are used to move goods around factories and warehouses. When not in use, or when being transported, for example in a lorry, it is desirable to be able to stack the dollies to reduce the amount of space taken up. The dollies are usually stacked by placing one dolly on another, so that the wheels of the upper dolly engage the base of the lower dolly. The base of each dolly defines four corner recesses in which the wheels of the upper dolly are received. However, the wheels can be in the form of rotatable casters. Therefore, ensuring the wheels are in the correct is orientation to be received in the recesses can be time consuming if a large number of dollies have to be stacked.

According to one aspect of this invention, there is provided a dolly comprising a body having an upwardly projecting first locating formation for locating a further dolly thereon in a stacked condition of said dollies, and the body having a second locating formation for stacking the dolly on a further dolly in a stacked condition of said dollies.

According to another aspect of this invention, there is provided a dolly comprising a body having an upwardly projecting first locating formation for locating a further dolly thereon in a stacked condition of said dollies, and the body having a second locating formation for stacking the dolly on a further dolly in a stacked condition of said dollies, wherein the first locating formation is engageable with a second locating formation on the further dolly stacked on the first mentioned dolly, and the second locating formation is engageable with a first locating formation of the further dolly on which the first mentioned dolly is stacked.

The body may comprise a base. The first locating formation may comprise an upstanding arrangement extending along a side of the base.

The base may have a length dimension and a width dimension, the length dimension being greater than the width dimension. The body of the dolly may have a centre, the first locating formation being spaced from the centre by a first distance, and the second locating formation being spaced from the second centre by a second distance. The first distance may be substantially equal to the second distance.

The first locating formation may extend lengthways along the base of the dolly. The second locating formation may extend widthways of the base of the dolly.

The first locating formation may comprise a wall member extending upwardly from the base. The upstanding arrangement may include a projecting member on the wall member.

The projecting member may be centrally arranged on the wall member and may extend partially along the wall member.

The body may comprise two of the first locating formations. Each of the first locating formations may comprise a respective upstanding arrangement. The first locating formations may be disposed along opposite sides of the base.

Each upstanding arrangement may extend lengthways along the dolly. Each projecting member may extend lengthways relative to the base of the dolly. Each projecting member may have opposite ends. The opposite ends of each projecting member may be chamfered.

Each upstanding arrangement may comprise a respective wall member extending upwardly from the base. The wall members may extend along the longer sides of the base. Each upstanding arrangement may additionally include a projecting member on the respective wall member. Each projecting member may project upwardly from the respective wall member. Each projecting member may extend along the respective wall member. Each projecting member may be centrally arranged on the respective wall member and may extend partially along the respective wall member. Each projecting member may be straight.

The base of the dolly may define an aperture. The second locating formation may comprise an edge region of the aperture. The first locating formation may be engageable with an edge region of an aperture in the base of a further dolly stacked on the first mentioned dolly to locate the first mentioned dolly and the further dolly in a stacked condition. The edge region of the aperture in the base of the first mentioned dolly may be engageable with a first locating formation on a further dolly on which the first mentioned dolly is stacked to locate the first mentioned dolly and the further dolly in a stacked condition.

The base may have an underside. The second locating formation may comprise a downwardly extending member on the underside. The downwardly extending member may extend across the underside.

The downwardly extending member of the first mentioned dolly may be engageable with a first locating formation on the base of a further dolly to locate the first mentioned dolly on the further dolly in a stacked condition of the dollies. The first locating formation on the base of the first mentioned dolly may be engageable with a downwardly extending member of a further dolly to locate the further dolly on the first mentioned dolly in a stacked condition. The base may define an aperture having an edge region. The downwardly extending member may be aligned with the aforesaid edge region of the aperture.

Each upstanding arrangement may extend lengthways along the dolly. Each projecting member may extend lengthways relative to the base of the dolly. Each projecting member may have opposite ends. The opposite ends of each projecting member may be chamfered.

The projecting member may extend lengthways relative to the base of the dolly. The projecting member may have opposite ends. The opposite ends may be chamfered.

When the dolly is stacked on a further dolly, the downwardly extending member of the dolly may engage the upstanding arrangement of the further dolly. When a further dolly is stacked on the dolly, the downwardly extending member of the further dolly may be seated on the wall member of the dolly, in engagement with the projecting member.

The second locating formation may conform to the shape of the first locating formation. The downwardly extending member may include opposite end regions that extend around the opposite ends of the projecting member when the first and second dollies are in the stacked condition.

The body of the dolly may comprise two of the second locating formations. Each of the second locating formations may comprise a respective edge region of the aperture. The respective edge regions may be opposite each other. The respective edge regions may be straight edge regions.

Each of the second locating formations may comprise a downwardly extending member on the base. Each of the downwardly extending members may extend downwardly from the underside. The downwardly extending members may extend across the underside.

Each of the upstanding arrangements on the base of the dolly may engage a respective one of the downwardly extending members of the further dolly to locate the dollies in the stacked condition. Each of the downwardly extending members may extend widthways across the dolly.

Each of the second locating formations may conform to the shape of the first locating formations. The downwardly extending members may include opposite end regions that conform to the shape of the chamfered opposite ends of the projecting members.

Where the base defines an aperture, the downwardly extending members may be aligned with a respective one of the aforesaid edge regions of the aperture.

When the dollies are in the stacked condition, each of the downwardly extending members of the dolly may engage a respective one of the upstanding arrangements of the further dolly.

Each of the downwardly extending members of the further dolly may be seated on a respective one of the wall members of the dolly, in engagement with the respective projecting member.

The second locating formations may conform to the shape of the first locating formations. Each downwardly extending member may include opposite end regions that extend around the opposite ends of the projecting members when the first and second dollies are in the stacked condition.

Each of the downwardly extending members may comprise a central elongate main portion. The main portions may extend along the edge regions of the aperture.

The end portions may be angled end portions. The end portions may extend at an obtuse angle relative to the main portion.

The aperture may be polygonal, such as rectangular, hexagonal or octagonal. In the embodiment described herein, the aperture may be octagonal.

Each upstanding arrangement on the base of the dolly may engage a respective edge of the aperture in the base of the further dolly to locate the dollies in the stacked condition.

The first locating formations may extend along the opposite longer sides. The further dolly may be arranged in a transverse position relative to the dolly in said stacked condition. In the transverse position, the longer sides of the further dolly may extend across and between the opposite longer sides of the dolly.

The aperture defined by the base may have opposite longer edges, which may extend substantially parallel to the longer sides of the base. The aperture defined by the base may have opposite shorter edges extending substantially parallel to the shorter sides of the base.

The shorter edges may extend transverse to the longer edges. Intermediate edges may extend diagonally from the longer edges to the shorter edges. The second locating formations may comprise the shorter edges. The second locating formations may comprise the downwardly extending members aligned with the shorter edges.

The dolly may include one or two of the first locating formations as described above. The dolly may include one or two of the second locating formations as described above.

The dolly may include a third locating formation for locating a container on the dolly. The third locating formation may comprise a further upstanding arrangement.

The further upstanding arrangement may comprise a further wall member extending upwardly from the base. The further wall member may extend between the first mentioned wall members. The further wall member may extend along one of the shorter sides of the base.

The further upstanding arrangement may additionally include a further projecting member on the further wall member. The further projecting member may extend along the further wall member. The further projecting member may be centrally arranged on the further wall member and may extend partially along the further wall member.

The body of the dolly may comprise two of the third locating formations. Each of the third locating formations may comprise a respective further upstanding arrangement. The third locating formations may be disposed along respective further sides of the base. The third locating formations may be disposed along opposite further sides of the base.

Each further upstanding arrangement may comprise a respective further wall member extending upwardly from the base. Each further wall member may extend along a respective one of the shorter sides of the base.

Each further upstanding arrangement may additionally include a further projecting member on the respective further wall member. Each further projecting member may extend along the respective wall member. Each further projecting member may be centrally arranged on the respective wall member and may extend partially along the wall member.

The upstanding arrangements may engage the container on the base to hold the container on the dolly. The further upstanding arrangements may engage the container on the base to hold the container on the dolly.

The container may be seated on the wall member. The projecting members may engage the container. The container may be seated on the further wall member. The further projecting members may engage the container.

According to another aspect of this invention, there is provided a dolly arrangement comprising: first and second dollies, the second dolly being stackable on the first dolly in a stacked condition of the dollies; wherein each dolly comprises a body, the body of the first dolly having a first locating formation, and the body of the second dolly having a second locating formation; the first locating formation being co-operable with the second locating formation to locate the dollies in the stacked condition.

According to another aspect of this invention, there is provided a method of stacking dollies, wherein the method comprises: providing first and second dollies; each dolly comprising a body, the body of the first dolly having a first locating formation, and the body of the second dolly having a second locating formation; arranging the second dolly on the first dolly in a stacked condition of the dollies in which the first locating formation co-operates with the second locating formation to locate the dollies in the stacked condition.

The body of each of the first and second dollies may comprise a base. The first locating formation may comprise an upstanding arrangement on the base of the first dolly. The first locating formation may extend along a side of the base of the first dolly.

The base of each of the first and second dollies may have a length dimension and a width dimension, the length dimension being greater than the width dimension. The base may have opposite longer sides extending the length of the base.

The base of each of the first and second dollies may have opposite shorter sides extending the width of the base. Each base may be rectangular in shape.

The first locating formation may extend lengthways along the first dolly. The body of the first dolly may have a first centre, and the first locating formation may be spaced from the centre by a first distance.

The second locating formation may extend widthways of the base of the second dolly. The base of the second dolly may define an aperture. The second locating formation may comprise an edge region of the aperture.

The edge region may comprise a straight edge region. The first locating formation on the base of the first dolly may engage the edge region of the aperture in the base of the second dolly to locate the first and second dollies in the stacked condition.

The body of the second dolly may have a second centre, and the locating formation may be spaced from the second centre by a second distance. The first distance may be substantially equal to the second distance.

The second locating formation may comprise a downwardly extending member on the base. The base may have an underside, and the downwardly extending member may extend downwardly from the underside. The downwardly extending member may extend across the underside.

The first locating formation on the base of the first dolly may engage the downwardly extending member of the second dolly to locate the first and second dollies in the stacked condition. The second dolly may have a second length and a second width, the downwardly extending member may extend widthways across the second dolly.

Where the base defines an aperture, the downwardly extending member may be aligned with the aforesaid edge region of the aperture.

The first locating formation may comprise a wall member extending upwardly from the base. The first locating formation may additionally include a projecting member on the wall member.

The projecting member may extend along the wall member. The projecting member may be centrally arranged on the wall member and may extend partially along the wall member. The projecting member may be straight.

The projecting member may extend lengthways relative to the base of the first dolly. The projecting member may have opposite ends. The opposite ends may be chamfered.

When the first and second dollies are in the stacked condition, the downwardly extending member of the second dolly may engage the first locating formation of the first dolly. The downwardly extending member of the second dolly may be seated on the wall member of the first dolly, in engagement with the projecting member.

The second locating formation may conform to the shape of the first locating formation. The downwardly extending member may include opposite end regions that extend around the opposite ends of the projecting member when the first and second dollies are in the stacked condition.

In the embodiments described herein, the feature of the second locating formation extending around the opposite ends of the first locating formation provides the advantage of preventing sideways movement of the dollies relative to each other.

The downwardly extending member may comprise a central elongate main portion. The main portion may extend along the edge region of the aperture. The end portion may be an angled end portion. The end portion may extend at an obtuse angle relative to the main portion.

The body of the first dolly may comprise two of the first locating formations. Each of the first locating formations may comprise a respective first locating formation. Each of the first locating formations may be disposed along a respective side of the base of the first dolly. The first locating formations may be disposed along opposite sides of the base.

Each first locating formation may extend lengthways along the first dolly. Each projecting member may extend lengthways relative to the base of the first dolly. Each projecting member may have opposite ends. The opposite ends of each projecting member may be chamfered.

Each first locating formation may comprise a respective wall member extending upwardly from the base. The wall members may extend along the longer sides of the base. Each first locating formation may additionally include a projecting member on the respective wall member. Each projecting member may project upwardly from the respective wall member. Each projecting member may extend along the respective wall member. Each projecting member may be centrally arranged on the respective wall member and may extend partially along the respective wall member. Each projecting member may be straight.

The body of the second dolly may comprise two of the second locating formations. Each of the second locating formations may comprise a respective edge region of the aperture. The respective edge regions may be opposite each other. The respective edge regions may be straight edge regions.

Each of the second locating formations may comprise a downwardly extending member on the base. Each of the downwardly extending members may extend downwardly from the underside. The downwardly extending members may extend across the underside.

Each of the first locating formations on the base of the first dolly may engage a respective one of the downwardly extending members of the second dolly to locate the first and second dollies in the stacked condition. Each of the downwardly extending members may extend widthways across the second dolly.

Each of the second locating formations may conform to the shape of the first locating formations. The downwardly extending members may include opposite end regions that conform to the shape of the chamfered opposite ends of the projecting members.

Where the base defines an aperture, the downwardly extending members may be aligned with a respective one of the aforesaid edge regions of the aperture.

When the first and second dollies are in the stacked condition, each of the downwardly extending members of the second dolly may engage a respective one of the first locating formations of the first dolly.

Each of the downwardly extending members of the second dolly may be seated on a respective one of the wall members of the first dolly, in engagement with the respective projecting member.

The second locating formations may conform to the shape of the first locating formations. Each downwardly extending member may include opposite end regions that extend around the opposite ends of the projecting members when the first and second dollies are in the stacked condition.

Each of the downwardly extending members may comprise a central elongate main portion. The main portions may extend along the edge regions of the aperture.

The end portions may be angled end portions. The end portions may extend at an obtuse angle relative to the main portion.

The aperture may be polygonal, such as rectangular, hexagonal or octagonal. In the embodiment described herein, the aperture may be octagonal.

Each first locating formation on the base of the first dolly may engage a respective edge of the aperture in the base of the second dolly to locate the first and second dollies in the stacked condition.

The first locating formations may extend along the opposite longer sides. The second dolly may be arranged in a transverse position relative to the first dolly in said stacked condition. In the transverse position, the longer sides of the second dolly may extend across and between the opposite longer sides of the first dolly.

The aperture defined by the base may have opposite longer edges, which may extend substantially parallel to the longer sides of the base. The aperture defined by the base may have opposite shorter edges extending substantially parallel to the shorter sides of the base.

The shorter edges may extend transverse to the longer edges. Intermediate edges may extend diagonally from the longer edges to the shorter edges. The second locating formations may comprise the shorter edges. The second locating formations may comprise the downwardly extending members aligned with the shorter edges.

The first dolly may include one or two of the second locating formations as described above. The second dolly may include one or two of the first locating formations as described above.

The dolly arrangement may comprise three or more dollies arranged upon one another in said stacked condition.

Each of the first and second dollies may include a third locating formation for locating a container on the dolly. The third locating formation may comprise a further upstanding arrangement.

The third locating formation may comprise a further wall member extending upwardly from the base. The further wall member may extend between the first mentioned wall members. The further wall member may extend along one of the shorter sides of the base.

The third locating formation may additionally include a further projecting member on the further wall member. The further projecting member may extend along the further wall member. The further projecting member may be centrally arranged on the further wall member and may extend partially along the further wall member.

The body of the first dolly may comprise two of the third locating formations. Each of the third locating formations may comprise a respective third locating formation. The third locating formations may be disposed along respective further sides of the base. The third locating formations may be disposed along opposite further sides of the base.

Each third locating formation may comprise a respective further wall member extending upwardly from the base. Each further wall member may extend along a respective one of the shorter sides of the base.

Each third locating formation may additionally include a further projecting member on the respective further wall member. Each further projecting member may extend along the respective wall member. Each further projecting member may be centrally arranged on the respective wall member and may extend partially along the wall member.

The upstanding arrangements may engage the container on the base to hold the container on the dolly. The third locating formations may engage the container on the base to hold the container on the dolly.

The container may be seated on the wall member. The projecting members may engage the container. The container may be seated on the further wall member. The further projecting members may engage the container.

At least one embodiment of the invention will now be described with reference to the accompanying drawings, in which.

Figure 1:
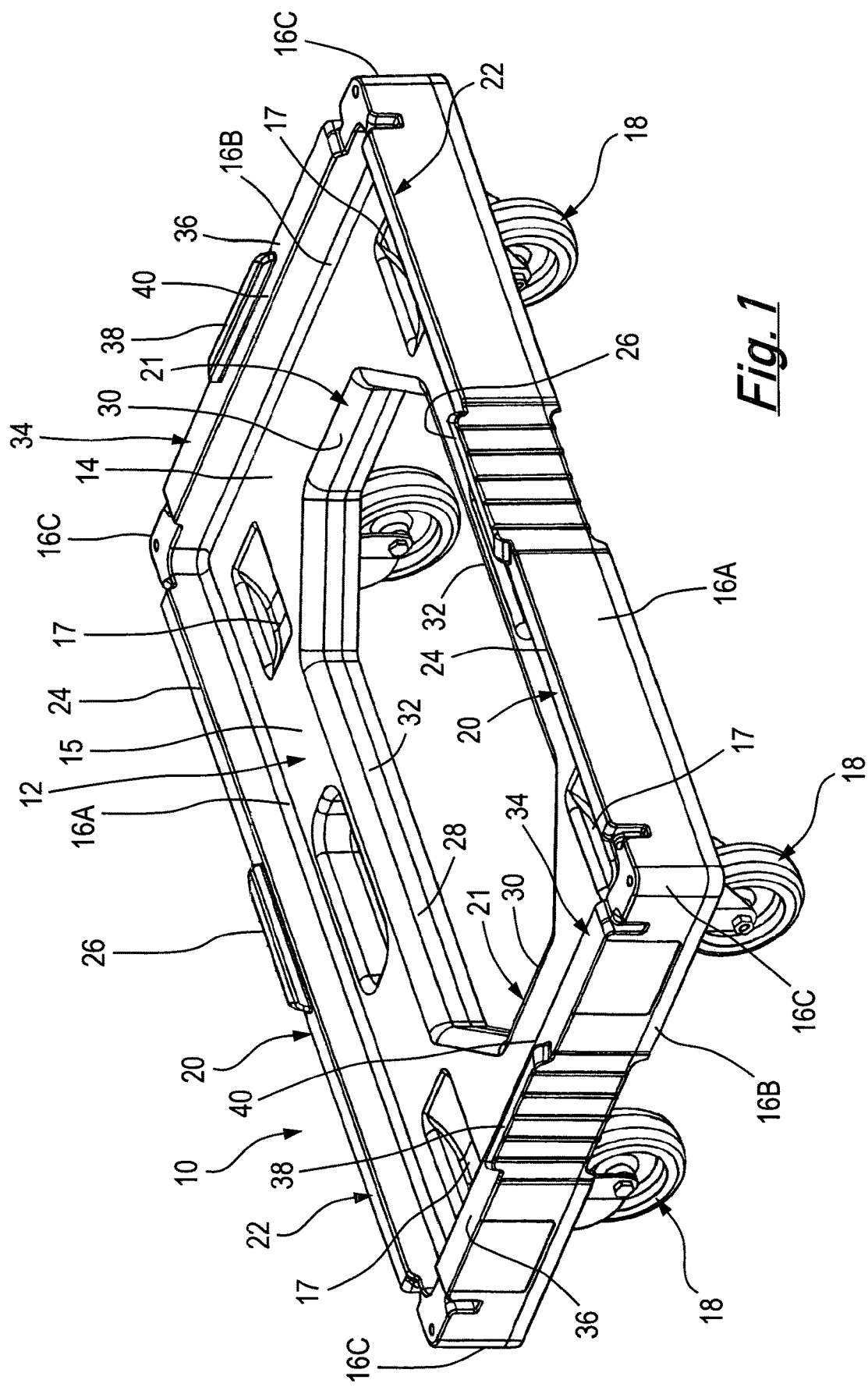
FIG. 1 is a perspective view from above of a dolly.

FIG. 1 shows a dolly 10 comprising a body 12 and a plurality of rollers on the body 12 to allow the dolly 10 to be moved around. The body 12 comprises a substantially rectangular base 14 having an upper surface 15, two longer sides 16A and two shorter sides 16B. The longer sides 16A extend transverse to the shorter sides 16B and meet at corners 16C. The upper surface of the base defines a wheel receiving recess 17 at each corner.

The rollers comprise wheels 18, and are attached to the base 14 at the corners 16C. The wheels 18 are in the form of casters that can be swivelled, thereby allowing easy maneuverability of the dolly 10. The wheels 18 are attached to the base 14 in a manner that would be known to the person skilled in the art.

Figure 2:
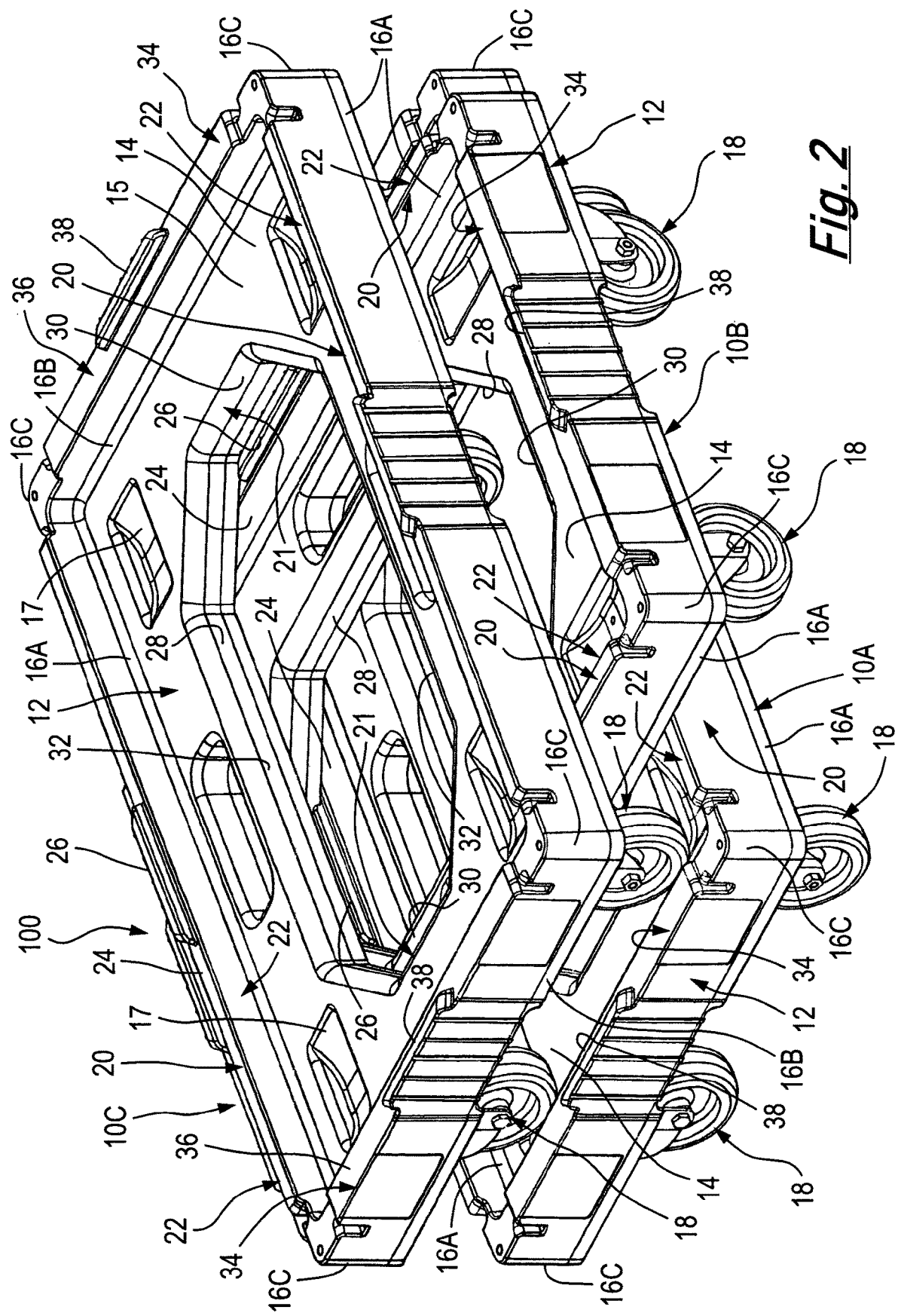
FIG. 2 is a perspective view of a dolly arrangement comprising three dollies arranged in a stacked condition.
Figure 3:
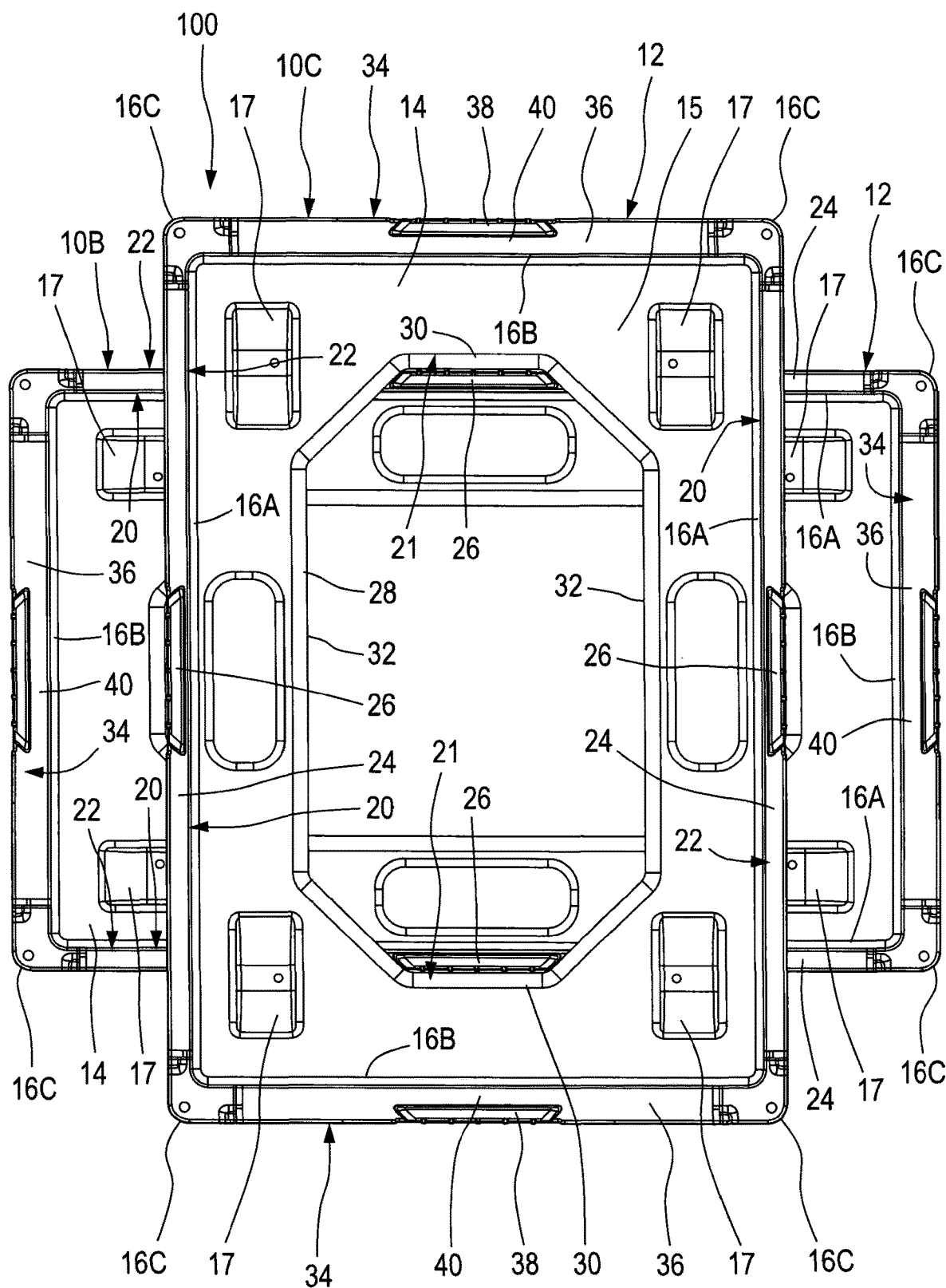
FIG. 3 is a top plan view of the dolly arrangement shown in FIG. 2.

FIGS. 2 and 3 show a dolly arrangement 100 comprising first and second of the dollies 10 arranged in a stacked condition. In the stacked condition, the second dolly, designated 10B in FIGS. 2 and 3, is stacked on the first dolly, designated 10A in FIG. 2. The second dolly 10B is stacked on the first dolly 10A in an orientation that is transverse to the orientation of the first dolly 10A.

In addition, the dolly arrangement 100 shown in FIGS. 2 and 3 comprises a third dolly, designated 10C. The third dolly 10C is stacked on the second dolly 10B. It will be appreciated by the skilled person that there can be any suitable number of dollies 10 arranged in the stacked condition. The first dolly 10A is not visible in FIG. 3, being obscured by the third dolly 10C.

The third dolly 10C is stacked on the second dolly 10B in an orientation that is transverse to the second dolly 10B. The orientation of the third dolly 10C is the same as the orientation of the first dolly 10A.

The body 12 of each of the dollies 10 further includes first and second locating formations 20, 21 for locating the dollies 10 in the stacked condition.

The dolly 10 includes two of the first locating formations 20, each comprising a respective upstanding arrangement 22 on the base 14. The upstanding arrangements 22 extend along opposite longer sides 16A of the base 14.

Each of the upstanding arrangements 22 comprises a longer wall member 24 extending along a respective one of the longer sides 16A of the base 14. Each upstanding arrangement 22 further includes a projecting member 26 on the longer wall member 24. The projecting member 26 has opposite ends, and projects upwardly from the top of the longer wall member 24.

The base 14 defines a generally octagonal central through aperture 28. The through aperture 28 has two opposite shorter edges 30 and two opposite longer edges 32. The shorter edges 30 extend transverse to the longer edges 32.

Intermediate edges extend diagonally between each shorter edge 30 and the adjacent longer edges 32. In the embodiment shown, the shorter edges 30 are the second locating formations 21.

The dolly 10 includes two of the second locating formations 21, each comprising a respective one of the opposite shorter edges 30 of the through aperture 28. The shorter edges 30 are straight and are substantially the same length as the projecting members 26.

The dollies 10 are stacked upon one another in a stacked condition in alternating relative transverse orientations, as shown in FIGS. 2 and 3. In the stacked condition, the base 14 of the second dolly 10B is arranged in engagement with the longer wall members 24 of the first dolly 10A.

In the stacked condition of the first and second dollies 10A, 10B, the projecting members 26 on the longer wall members 24 of the first dolly 10A are received in the aperture 28 of the second dolly 10B. Each of the projecting members 26 engages a respective one of the shorter edges 30 of the aperture 28 defined by the body 12 of the second dolly 10B. As a result, the second dolly 10B is located on the first dolly 10A.

The third dolly 10C is stacked on the second dolly 10B in a transverse orientation relative thereto. The third dolly 10C is arranged in the same orientation as the first dolly 10A.

The projecting members 26 on each longer wall member 24 of the second dolly 10B are received in the aperture 28 defined in the base 14 of the third dolly 10C. The projecting members 26 on the longer wall members 24 of the second dolly 10B engage the shorter edges 30 of the aperture 28 defined by the base 14 of the third dolly 10C. Thus, the third dolly 10C is located on the second dolly 10B. When so stacked, the wheels 18 of the third dolly 10C are received in the wheel receiving recesses of the first dolly 10A.

Any suitable number of further dollies 10 can be stacked on one another on the above mentioned dollies 10.

Figure 4:
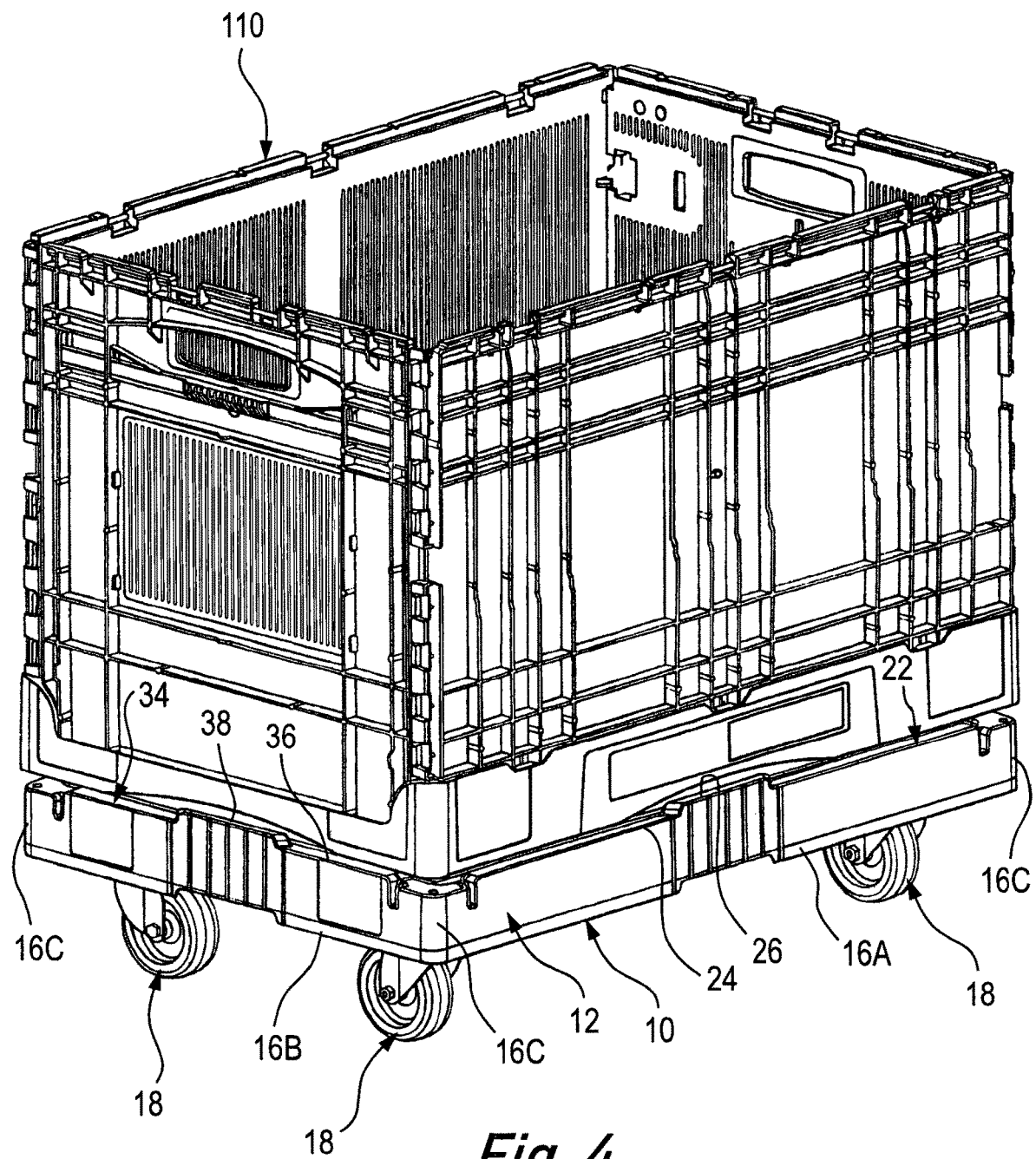
FIG. 4 shows a dolly with a container thereon.
Figure 5:
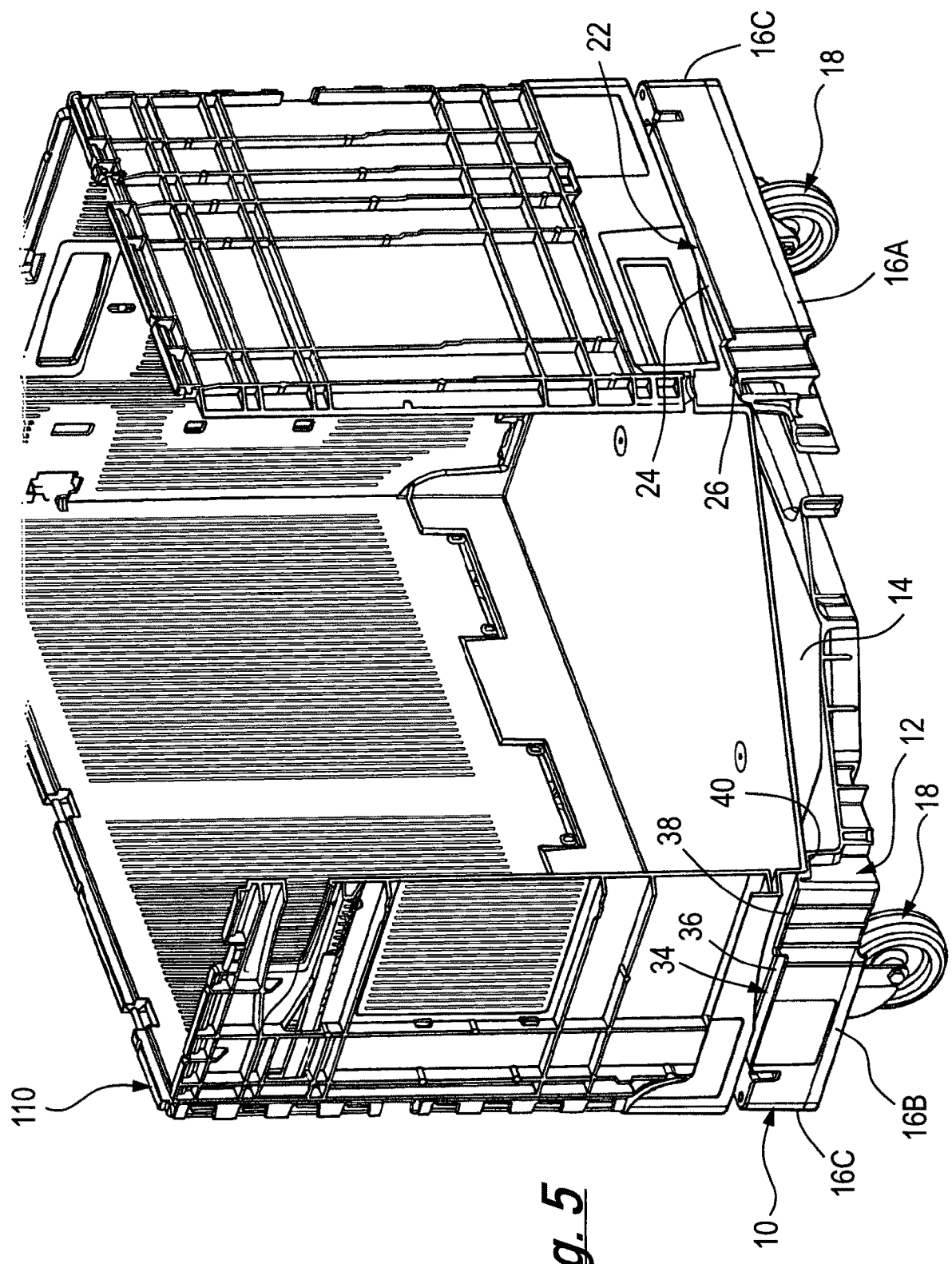
FIG. 5 shows the dolly and the container shown in FIG. 4, with regions of the dolly and the container cut away.
Figure 6:
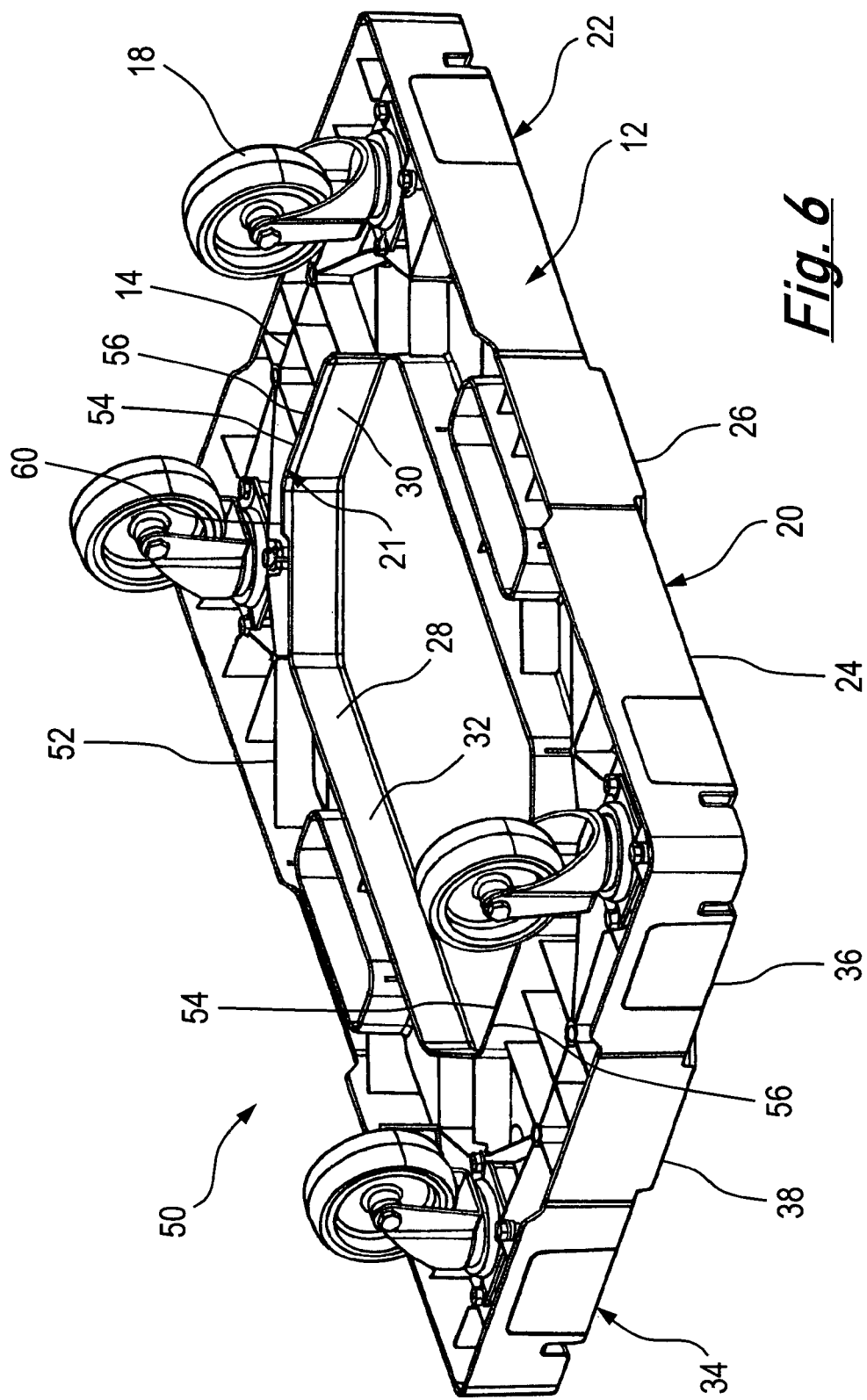
FIG. 6 is a view from one end of the underside of a modified version of the dolly.
Figure 7:
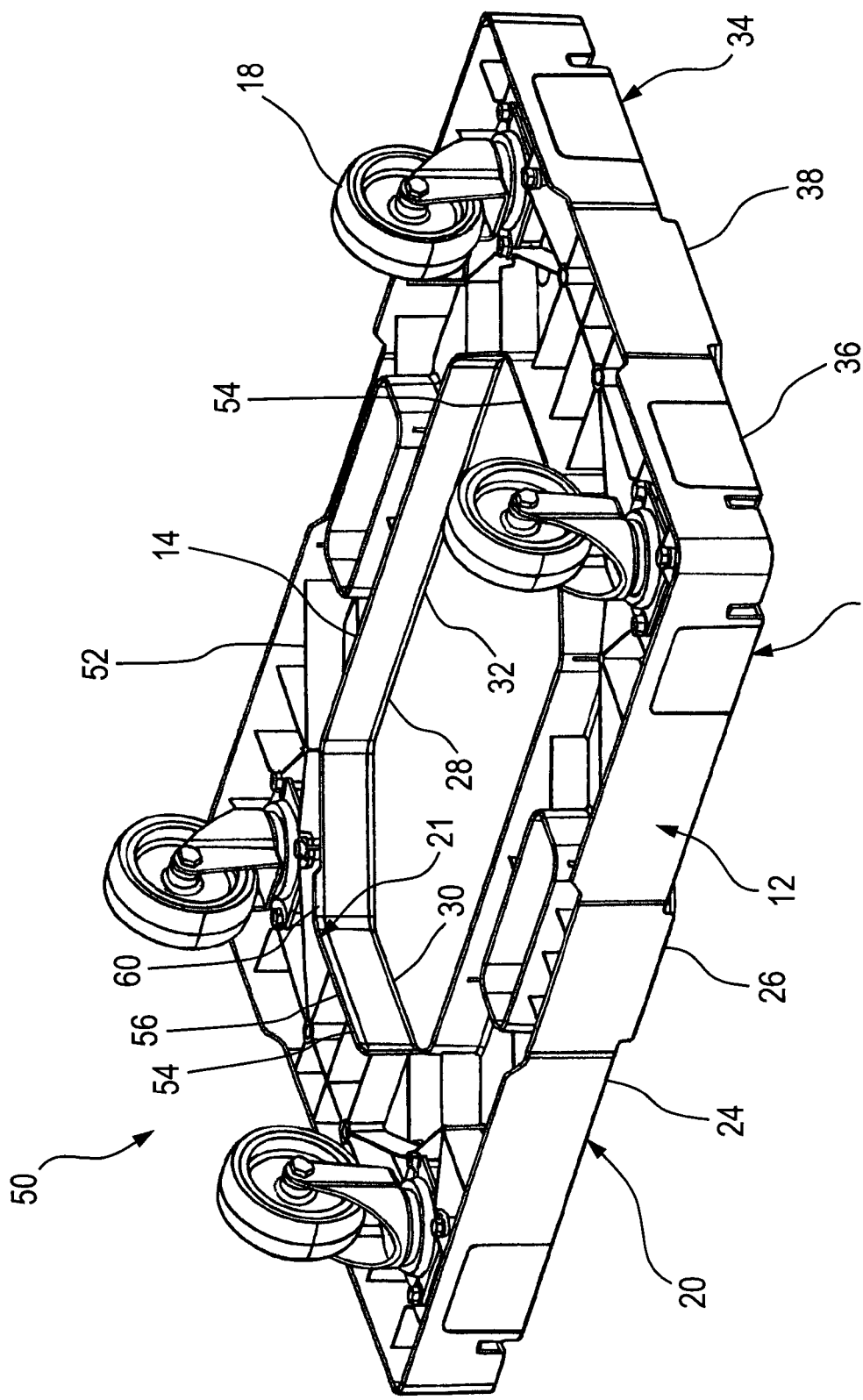
FIG. 7 is a view from the opposite end of the underside of the dolly shown in FIG. 6.
Figure 8:
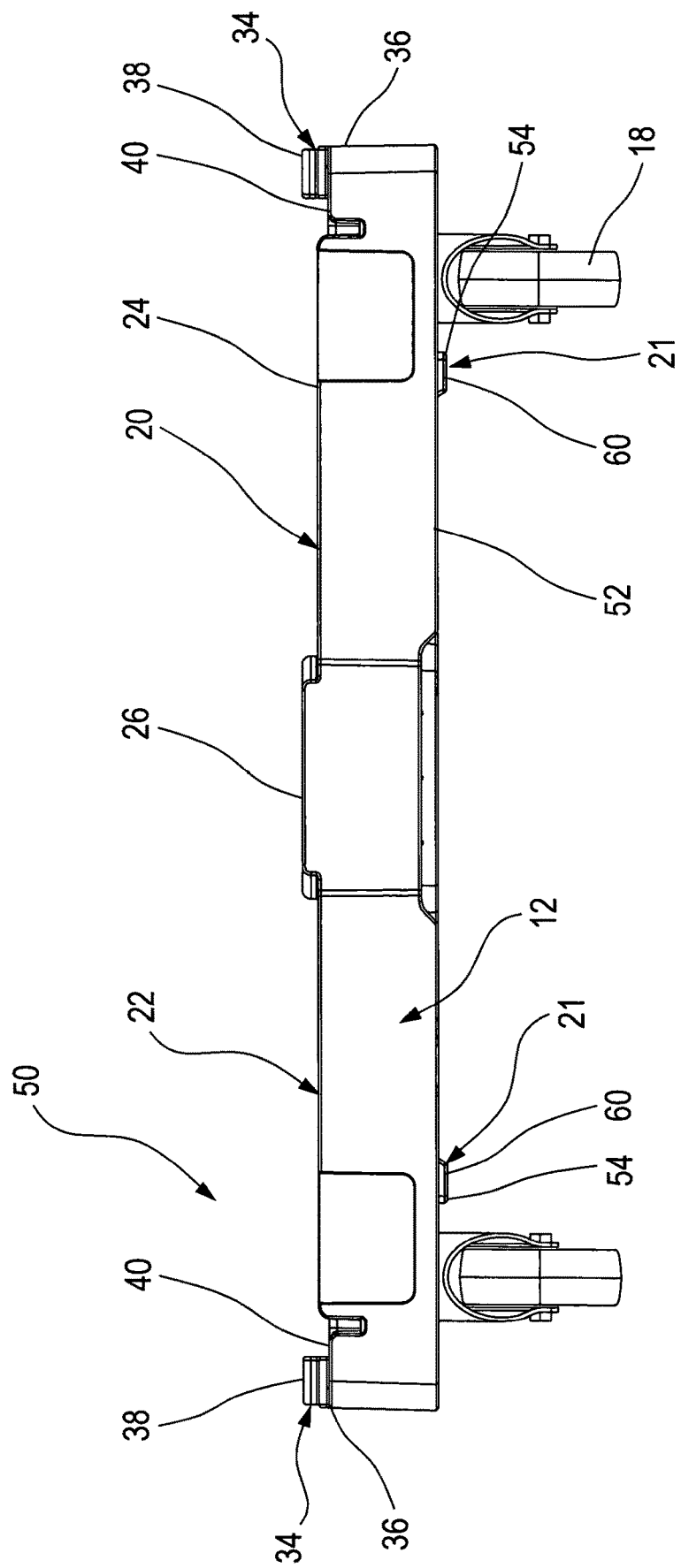
FIG. 8 is a side view of the dolly shown in FIG. 6.

Referring to FIGS. 3 and 4, the dolly 10 includes two third locating formations 34, the purpose of which, along with the first locating formations 20, is to locate a container 110 on the dolly.

Each of the third locating formations 34 comprises a further upstanding arrangement comprising a respective shorter wall member 36 and a further projecting member 38 on the shorter wall member 36. The shorter wall members 36 and further projecting members 38 are provided on the opposite shorter sides 16B of the body 12.

A shoulder portion 40 is provided between the shorter wall members 36 and the respective further projecting members 38 (see FIG. 3).

The shoulder portions 40 extend inwardly of the body 12 from the further projecting members 38. The container 110 is supported on the shoulder portions 40 and is located thereon by the further projecting members 38 and the projecting members 26. The projecting members 26 and the further projecting members 38 engage lower regions of the container 110 to locate the container 110 on the dolly 10.

There is thus described a dolly having first and second locating formations 20, 21 as described, for locating a plurality of dollies in a stacked condition thereby forming a dolly arrangement 100. The dolly also includes a third locating arrangement which acts with the first locating arrangement to locate a container on the dolly.

Various modifications can be made without departing from the scope of the invention. For example, the central through aperture 28 defined by the base 14 may have any suitable shape.

FIGS. 6 to 12 show a modified version of a dolly, generally designated 50. The dolly 50 comprises all of the features of the dolly 10. These features have been designated with the same reference numerals as the corresponding features in FIGS. 1 to 5.

The dolly 50 has an underside 52 and includes two second locating formations 21, which comprise downwardly extending members 54. The downwardly extending members 54 extend across, and downwardly from, the underside 52 of the dolly 50.

The downwardly extending members 54 are provided adjacent the shorter edges 30 of the aperture 28. Each of the downwardly extending members 54 is aligned with a respective one of the shorter edges 30.

Each of the downwardly extending members 54 comprises a central elongate main portion 56 extending along the shorter edge 30, and angled end portions 60 that extend at an obtuse angle relative to the main portion 56.

Figure 9:
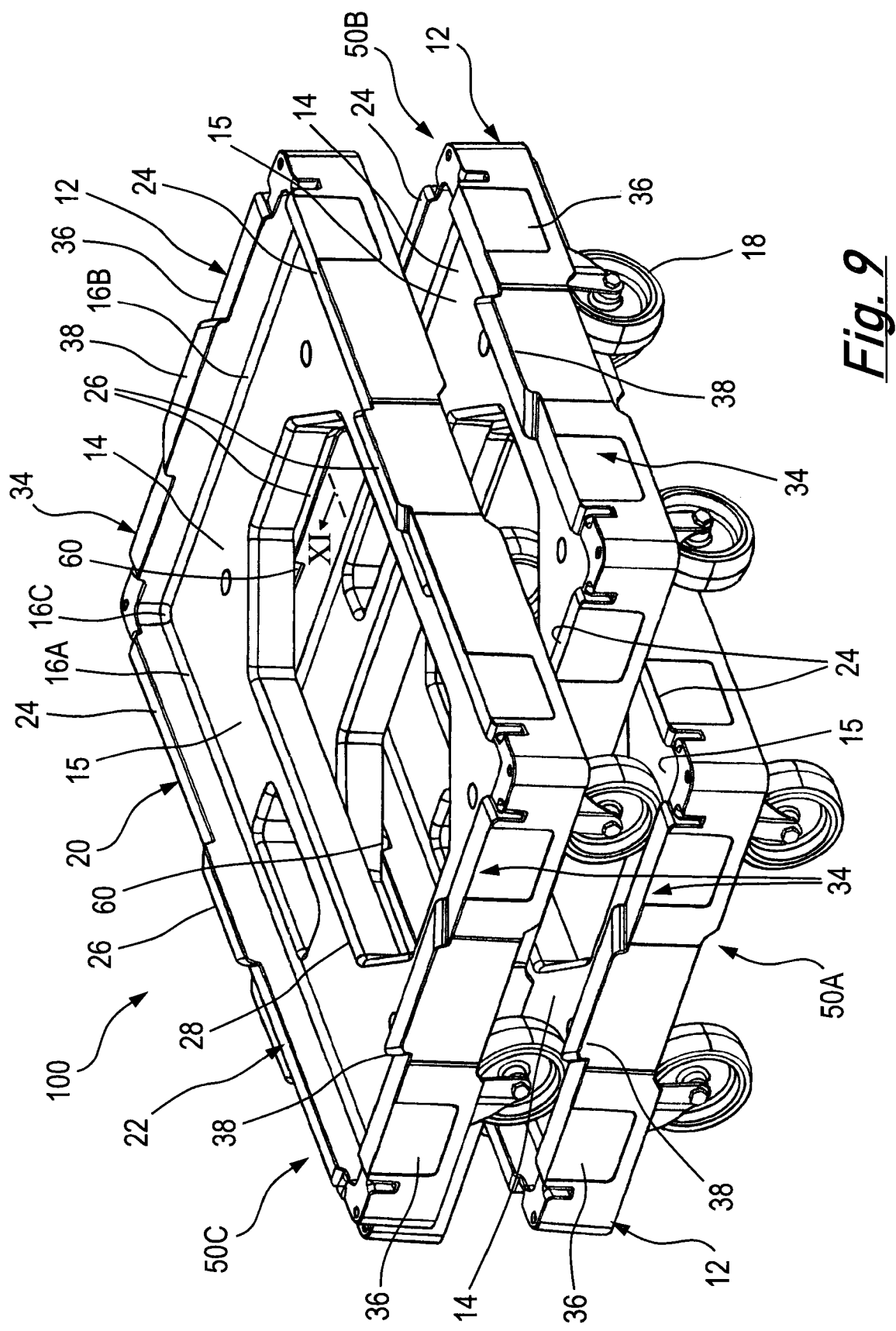
FIG. 9 is a perspective view of three of the dollies shown in FIG. 6 in a stacked condition.
Figure 10:
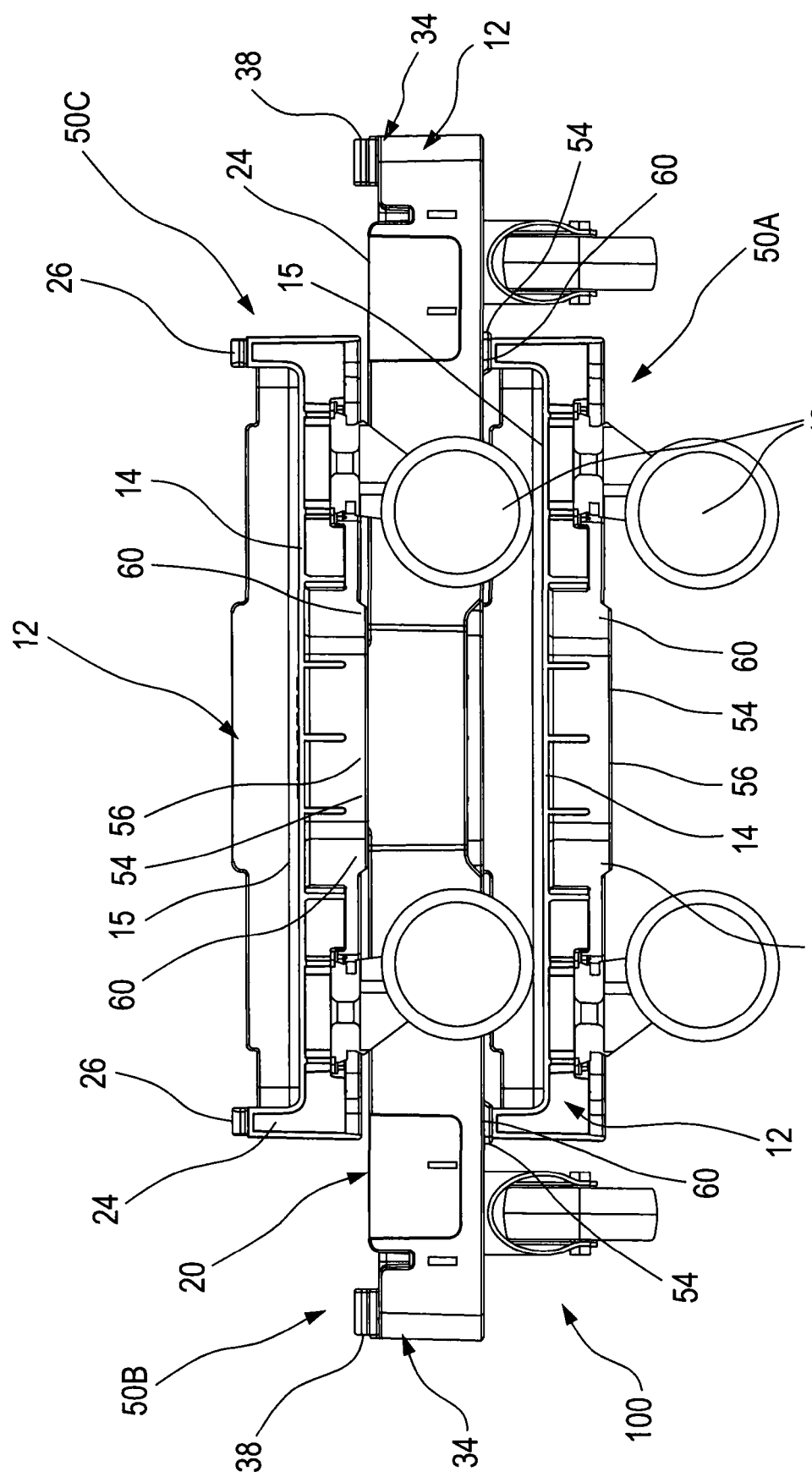
FIG. 10 is a sectional side view of the three stacked dollies shown in FIG. 9.

FIGS. 9 and 10 show three of the dollies 50, namely a first dolly designated 50A, a second dolly designated 50B, and a third dolly designated 50C. The dollies 50 shown in FIGS. 9 and 10 are stacked upon one another in relative transverse orientations, in which the first dolly 50A is disposed on the ground.

The second dolly 50B is stacked on the first dolly 50A in an orientation that is transverse to the orientation of the first dolly 50A. The third dolly 50B is stacked on the second dolly 50A in an orientation that is transverse to the orientation of the second dolly 50A, and the same as the orientation of the first dolly 50A. Thus, the stacked condition of the dollies 50 is the same as the stacked condition of the dollies 10 shown in FIGS. 2 and 3.

In the stacked condition of the dollies 50, each of the downwardly extending members 54 of the second dolly 50B engages a respective one of the opposite longer wall members 24 of the first dolly 50A. The downwardly extending members 54 engage the longer wall members 24 alongside a respective one of the projecting members 26.

Figure 11:
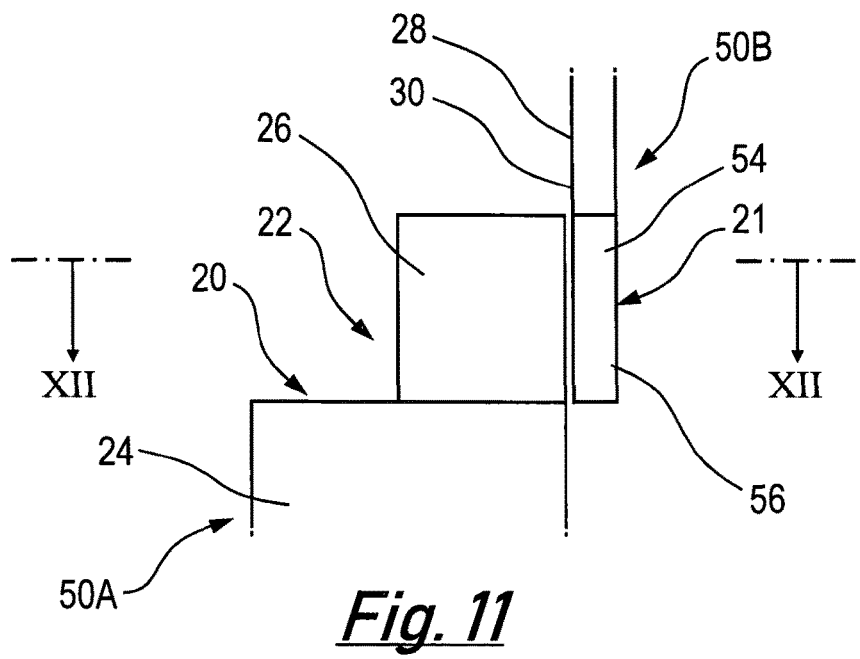
FIG. 11 is a sectional side view, in the direction of the arrow marked XI in FIG. 10, of a downwardly extending member and a projecting member of two stacked dollies.
Figure 12:
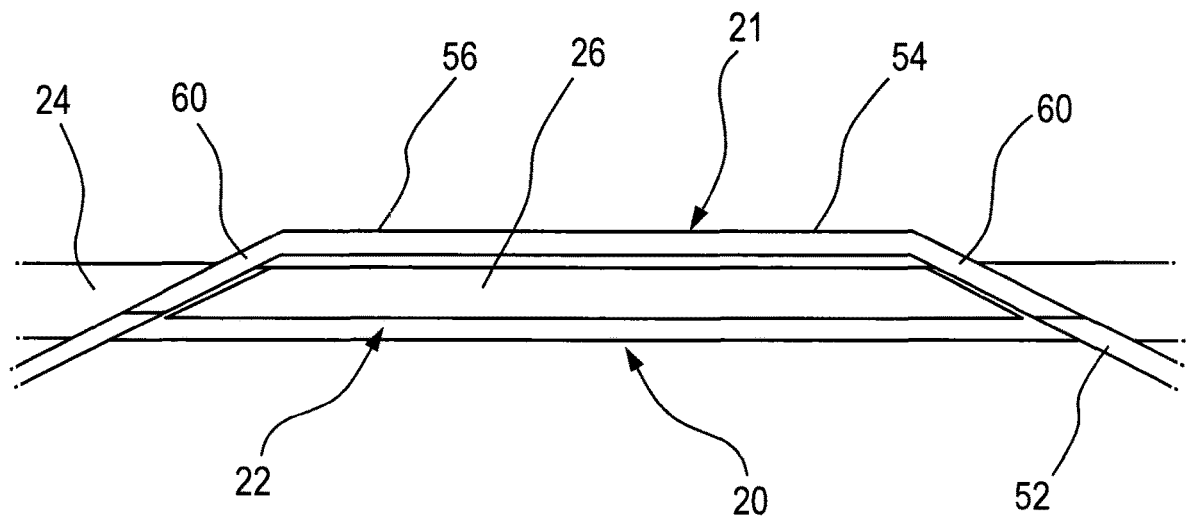
FIG. 12 is a view along the lines XII-XII in FIG. 11.

FIGS. 10 and 11 are schematic sectional views showing the positioning of one of the downwardly extending members 54 relative to one of the projecting members 26 of two stacked dollies 50A, 50B.

The main portions 56 of each of the downwardly extending members 54 contact the respective projecting member 26 along the length of the projecting member 26, thereby preventing backwards and forwards movement of the first and second dollies 50A, 50B relative to each other.

The angled end portions 60 of the downwardly extending members 54 extend around the opposite ends of projecting members 26, thereby preventing side to side movement of the first and second dollies 50A, 50B relative to each other.

In the stacked condition described above, the projecting members 26 on the longer wall members 24 of the first dolly 50A engage the downwardly extending members 54 of the second dolly 50B. As a result, the second dolly 50B is located on the first dolly 50A. The base 14 of the second dolly 50B is spaced above the longer wall members 24 of the first dolly 50A.

The third dolly 50C is stacked on the second dolly 50B in a transverse orientation relative thereto. The third dolly 50C is arranged in the same orientation as the first dolly 50A.

The projecting members 26 on each longer wall members 24 of the second dolly 50B engage the downwardly extending members 54 of the third dolly 50C. This locates the third dolly 50C on the second dolly 50B, and spaces the base 14 of the third dolly above the longer wall members 24 of the second dolly 50B.

Thus, in the stacked condition of the dollies 50A, 50B and 50C shown in FIGS. 9 and 10, the downwardly extending members 54 of the second dolly 50B engage the longer wall members 24 of the first dolly 50A, thereby spacing the base 14 of the second dolly 50B from the longer wall members 24 of the first dolly 50A. Similarly, the engagement of the downwardly extending members 54 of the third dolly 50C with the longer wall members 24 of the second dolly 50B spaces the base 14 from the longer wall members 24 of the second dolly.

The effect of the spacing of the base 14 of each of the second and third dollies 50B, 50C from the wall members 24 of the first and second dollies 50A, 50B has the effect of spacing the wheels 18 of the third dolly 50C above the base 14 of the first dolly 50A. As a result, wheel receiving recesses in the base 14 are not needed. The advantage of this is that the person stacking the dollies 50 does not have to ensure that the wheels 18 of every alternate dolly 50 do not have to be received in the wheel receiving recesses in the dolly two below.

This provides the advantage for the dolly 50 shown in FIGS. 6 to 10 that the stacking of the dollies can be faster if it is not necessary to align the wheels with wheel receiving recesses.

The invention claimed is:

1. A dolly comprising:
   a body having a base and an upwardly projecting first locating formation for locating a further dolly thereon in a stacked condition of said dollies, wherein the first locating formation comprises an upstanding arrangement extending along a side of the base;
   the body having a second locating formation for stacking the dolly on a further dolly in a stacked condition of said dollies;
   wherein the upstanding arrangement is engageable with a second locating formation of the further dolly stacked on the first mentioned dolly, and the second locating formation is engageable with an upstanding arrangement of the further dolly on which the first mentioned dolly is stacked;
   wherein the base has a length dimension and a width dimension, the length dimension being greater than the width dimension; and
   wherein the first locating formation extends lengthways along the base of the dolly, and the second locating formation extends widthways across a central region of the base of the dolly;
   wherein the base has an underside, and the second locating formation comprises a downwardly extending member on the underside.

2. A dolly according to claim 1, wherein the body of the dolly has a centre, the first locating formation being spaced from the centre by a first distance, and the second locating formation being spaced from the centre by a second distance;
   and wherein the first distance is substantially equal to the second distance.

3. A dolly according to claim 1, wherein the base of the dolly defines an aperture, and the second locating formation comprises an edge region of the aperture.

4. A dolly according to claim 3, wherein the body comprises two of the second locating formations, each of the second locating formations comprising a respective edge region of the aperture, the edge regions being opposite each other.

5. A dolly according to claim 1, wherein the base defines an aperture having an edge region, and the downwardly extending member is aligned with the aforesaid edge region of the aperture.

6. A dolly according to claim 5, wherein the downwardly extending member comprises opposite end regions and a central elongate main portion extending between the end regions, and wherein the end regions are angled towards the centre of the body, each end region extending at an obtuse angle relative to the main portion.

7. A dolly according to claim 6, wherein each of the second locating formations comprises a downwardly extending member extending from the underside of the base.

8. A dolly according to claim 7, wherein the downwardly extending members are aligned with a respective one of the aforesaid edge regions of the aperture.

9. A dolly according to claim 8, wherein each of the downwardly extending members comprises opposite end regions and a central elongate main portion extending between the end regions, the end portions being angled towards the centre of the body at respective obtuse angles relative to the respective main portions.

10. A dolly arrangement comprising: first and second dollies, each of the first and second dollies being in the form of a dolly as claimed in claim 1, the second dolly being stackable on the first dolly in a stacked condition of the dollies;
    wherein the upstanding arrangement of the first dolly is co-operable with the second locating formation of the second dolly to locate the dollies in the stacked condition.

11. A dolly comprising:
    a body having a base and an upwardly projecting first locating formation for locating a further dolly thereon in a stacked condition of said dollies, wherein the first locating formation comprises an upstanding arrangement extending along a side of the base;
    the body having a second locating formation for stacking the dolly on a further dolly in a stacked condition of said dollies;
    wherein the upstanding arrangement is engageable with a second locating formation of the further dolly stacked on the first mentioned dolly, and the second locating formation is engageable with an upstanding arrangement of the further dolly on which the first mentioned dolly is stacked;
    wherein the base has a length dimension and a width dimension, the length dimension being greater than the width dimension; and
    wherein the first locating formation extends lengthways along the base of the dolly, and the second locating formation extends widthways across a central region of the base of the dolly;
    wherein the first locating formation comprises a wall member extending upwardly from the base, and the first locating formation including a projecting member on the wall member.

12. A dolly according to claim 11, wherein the opposite ends of the projecting member are chamfered, and wherein the second locating formation conforms to the shape of the first locating formation.

13. A dolly according to claim 11, wherein the body comprises two of the first locating formations, each of the first locating formations comprising a respective upstanding arrangement, and each of the first locating formations being disposed along a respective opposite side of the base of the first dolly.

14. A dolly according to claim 13, wherein each first locating formation comprises a respective wall member extending upwardly from the base, and each upstanding arrangement includes a projecting member on the respective wall member.

15. A dolly according to claim 14, wherein each projecting member projects upwardly from the respective wall member, and each projecting member extends along the respective wall member.

16. A dolly according to claim 11, including a third locating formation for locating a container on the dolly, the third locating formation comprises a further upstanding arrangement.

17. A dolly according to claim 16, wherein the third locating formation comprises a further wall member extending upwardly from the base, the further wall member extending between the first mentioned wall members, and the third locating formation includes a further projecting member extending along the further wall member.

18. A dolly according to claim 17, wherein the body comprises two of the third locating formations, each of the third locating formations comprising a respective further upstanding arrangement, the third locating formations being disposed along opposite sides of the base.

19. A dolly according to claim 17, wherein each third locating formation comprise a respective further wall member extending upwardly from the base, and each further upstanding arrangement additionally including a further projecting member on the respective further wall member.

* * * * *